United States Patent

[11] 3,622,759

| [72] | Inventor | Edward James Fitzell<br>Birkenfeld, Oreg. 97016 |
|---|---|---|
| [21] | Appl. No. | 838,374 |
| [22] | Filed | June 30, 1969 |
| [45] | Patented | Nov. 23, 1971 |

[54] PELLET CODE SETUP, TRANSFER AND DECODING DEVICE
7 Claims, 7 Drawing Figs.

| [52] | U.S. Cl. | 235/61.11 B |
|---|---|---|
| [51] | Int. Cl. | G06k 7/04 |
| [50] | Field of Search | 235/61.11; 178/22 |

[56] References Cited
UNITED STATES PATENTS

| 2,406,031 | 8/1946 | Parker | 178/22 |
|---|---|---|---|
| 2,412,301 | 12/1946 | Spencer | 178/22 |
| 2,832,826 | 4/1958 | Hagelin | 178/22 |
| 2,922,141 | 1/1960 | Simmerman et al. | 178/22 |
| 2,948,881 | 8/1960 | Berti et al. | 178/22 |
| 3,340,385 | 9/1967 | Jonker et al. | 235/61.11 |

*Primary Examiner*—Daryl W. Cook
*Attorneys*—John W. Behringer, Eugene L. Bernard, Martin J. Brown, James N. Dresser, Morton, Bernard, Brown, Roberts & Sutherland, W. Brown Morton, Jr., John T. Roberts and Malcolm L. Sutherland

ABSTRACT: A pellet setup and transfer device. A cylinder is mounted for rotation about its longitudinal axis and has a plurality of pellet-receiving recesses in its surface. A pellet supply provides pellets to the recesses as desired. As the cylinder rotates, the pellets are rotated to a discharge point, being retained on the cylinder during rotation by a cover. The pellets are discharged into holes in an endless belt. Rods pass through the endless belt holes, and with respect to those holes in which pellets are situated the rods cause the pellets to push against actuating rods thereby moving them, while with respect to those holes in which no pellets are situated rods enter the actuating rods, thereby leaving them stationary.

PATENTED NOV 23 1971

PELLET CODE SETUP, TRANSFER AND DECODING DEVICE

The invention relates to computer-type of small office machines requiring a relatively slow input signal. It primarily is intended as a part of a print-reading machine for the blind. The invention comprises of pellet-feeding and pellet-sensing units joined by a transfer unit, preferably a special belt. A code by pellets is set up from gates from a hopper, to a (multiple) transfer wheel and then to the belt, or directly to the belt from the gates and the belt takes this code pattern to the sensing unit or units. It is of a mechanical rather than electronic in nature and thus lower in cost, simple in design and requires less technical knowledge and skill to understand and service.

Figure 5A:
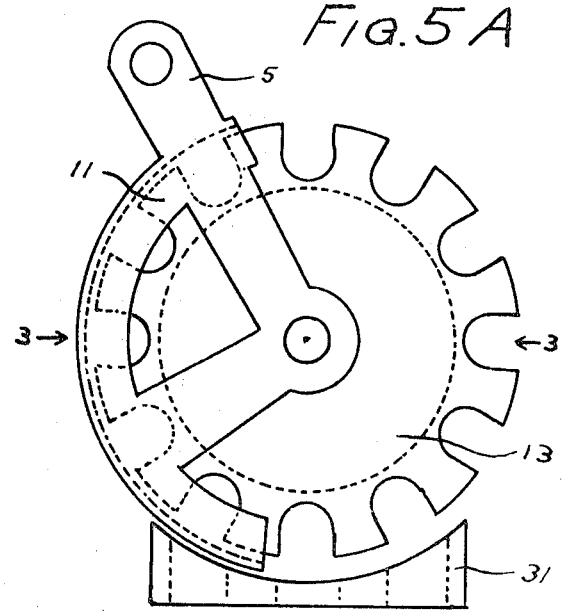
FIG. 5A shows the transfer wheel with its cover and a multiple-tube pellet delivery guide (below).
Figure 5B:
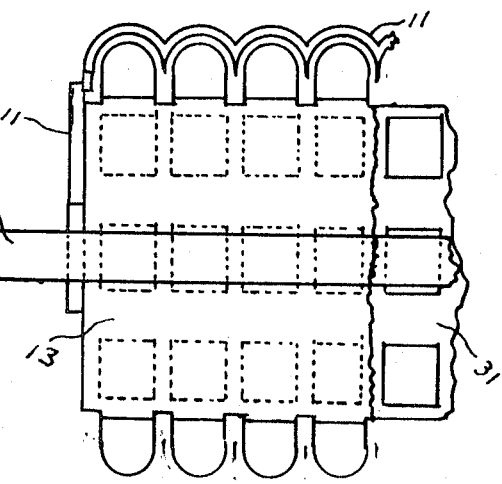
FIG. 5B shows a cross section view cut on line 3—3 of FIG. 5A.

These drawings are for simplicity and illustrative purposes and not for the capacity desired. Thus there would be many more notches on larger transfer wheels, closer setting of holes on the belt and other trivial points that are quite apparent like the size or the pawls in relation to other parts. Referring to the transfer wheel 13 in FIG. 5A and 5B, it will be noticed that the cover (housing) is needed to retain the pellets on their line from the gate or wheel of this multiwheel as well as their outward side from the wheel. From a descriptive standpoint this transfer wheel is similar to a multiple chain sprocket wheel in main configuration requiring a cover to include the sides as well as the top over the teeth to retain pellets. It is simpler to make and should stay clean easier and easier to clean as only part of the wheel's circumference needs a permanent cover. Also shown in FIG. 5A and 5B a multiple-tube pellet guide 31 below the transfer wheel 13. It could accept code groups in pellets 2 from the transfer wheel. To supply these groups the cover 11 of the transfer wheel 13 pivots on the main shaft 20 and can be moved to accumulate these groups by the movement of the cover 11 by its arm and pin 5 and common power source link 22. It would discharge the code groups by moving back to its former position acting as a gate for the multiple-tube pellet guide 31. These pellets might reach the output unit FIG. 3A and 3B by a multiple delivery tube and gravety or other way besides the belt method as an alternate method. For belt type of operation hopper post pin 6 on hopper post 33 and transfer wheel cover arm pin 5 would be tied by tie link 34 so as pellets would be discharged only in groups of one column at a time rather than many columns at a time; the transfer wheel cover would remain in one position.

It is probable that the speed of the device (this invention) will be limited by the machine's output it services. Output is referred to as the device's output FIGS. 3A and 3B. The output controls its own input speeds by holding the belt at rest for its operations. The input units FIG. 1 on or near their end of free travel on the belt 23 slow or stop their input signal source. The preferential way, here described, uses a specially made belt FIG. 2. It is an endless belt held between two end pulleys and sprocket wheels. The input unit FIG. 1 places upon the belt's flat top surface, arbitrarily, in or on the holes 26 pellets 2 of a uniform size to be accommodated, singly, to a hole. A quantity of these pellets 2 thus form a code pattern on the belt. This pattern is dictated by the built-in features of the input unit FIG. 1 and the input electrical signal it receives (converted to mechanical power by common means); explained in detail later.

The belt 23 has holes through it in uniform columns (across it) making straight rows of these same holes (lengthwise with it) 26. It also has a row or rows of through holes 25 as sprocket wheel tooth holes. These holes 25 may or may not be identical in placement (spacing) or form to the holes for the pellets 26. The pellets may be cubical, spherical, related to either or mixed in their lots, in form. The holes for the pellets 26 in the belt are designed to accommodate the kind or kinds of pellets used so as they are placed, by the input (and identical editing) unit FIG. 1 singly to a hole 26. Should the holes 26 be larger than the pellets 2 used, so as they would drop through the belt 23, a bed or floor 24 is used to retain the pellets 2. The special belt is either a type similar to a flat rubber of canvas belt containing the pellet 26 and sprocket wheel tooth holes 25 or a flat belt build up of nonflexible materials with the special holes 26, 25 and with flexible joints or a combination of flexible and nonflexible materials to gain the same purpose. Where nonflexible material is used a form of belt 23 similar in construction to plates, with holes for the pellets 26, held between two parallel block, roller, silent, or linkbelt chains is used to form the belt 23. However, the belt 23 could be built up of these plates held to a single of these type of chains or between the halves of two parallel such chains referred to above for parallel chains provided that both the pellet holes 26 and sprocket wheel tooth holes were provided.

Figure 3A:
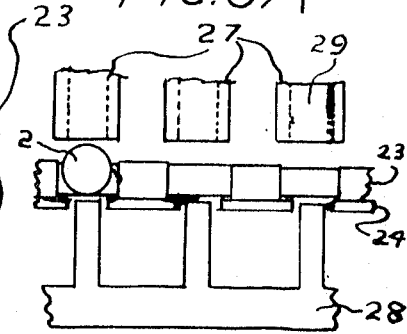
FIG. 3A shows (for the sensing unit) two punches of the punch assembly to illustrate the assembly below the belt when it and the belt are at rest.
Figure 3B:
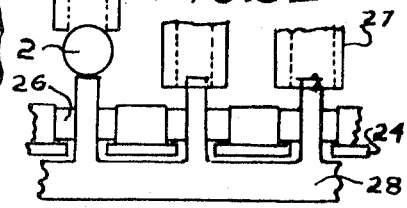
FIG. 3B is the same as FIG. 3A except it shows how the punch assembly punches rise the pellets (when they are present) and then in turn rise the holed top members.
Figure 4:
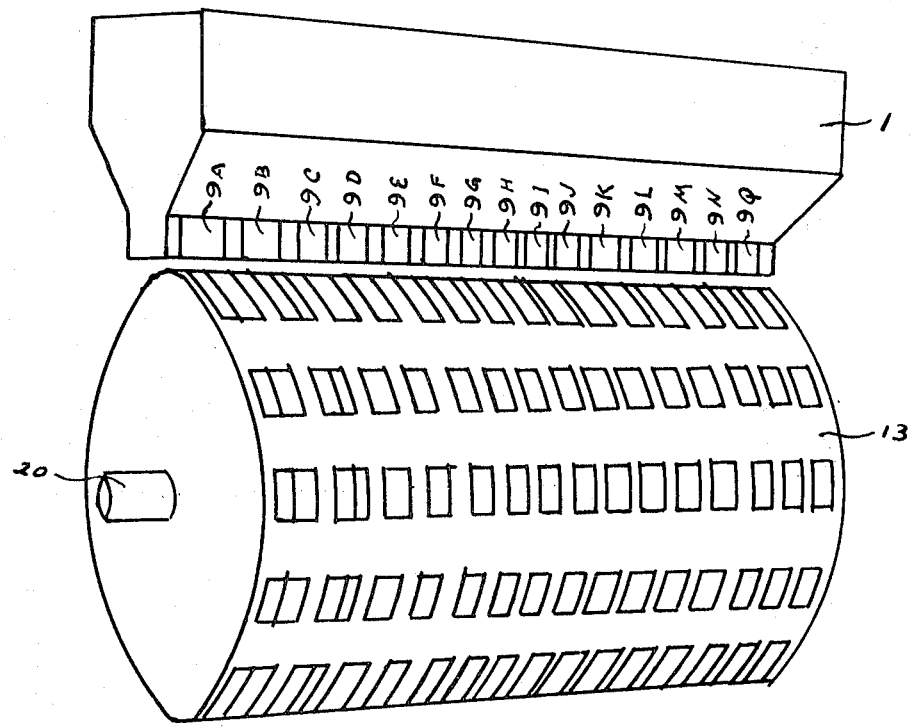
FIG. 4 is a prospective view showing the hopper its gates and (multiple) transfer wheel less its cover.

The first of the units on the travel of the belt (to feed pellets onto the belt) would be the input and editing units. These units FIG. 1 by virtue of their built-in features and signal they receive, place the pellets 2 from a hopper 1 by way of gates 9 A, B, C, etc. and transfer wheel 13 in or onto discrete holes 26 of the belt to form a code pattern. The input and editing units may be two or more units or combined into one unit FIG. 1. In order that each of these units will not be adversely affected by the stoppages or speeds of the travel of the belt 23 in its travel around its end pulleys and sprocket wheels these units are given some free travel of their own FIG. 1 from their located position with the travel of the belt and returned there by return spring 4. If there were a preoutput unit it too would be given the same free travel and control advantages as the input and editing units. Its design is not covered in this invention. The output unit FIGS. 3A and 3B is fastened to the device's frame and is stationary in its position in relation to the belt's travel. FIGS. 3A and 3B illustrates only the way the assembly of this unit operates and, of course, these parts move. On passing beyond this unit the belt passes over its end pulley and sprocket wheel drive and the pellets fall from the belt 23 at this point and are returned to the hoppers FIG. 1 that they originated from by some common way of return.

OPERATION

To attain these simple "program" operations should not need the detailed explanations so are not included here.

Figure 1:
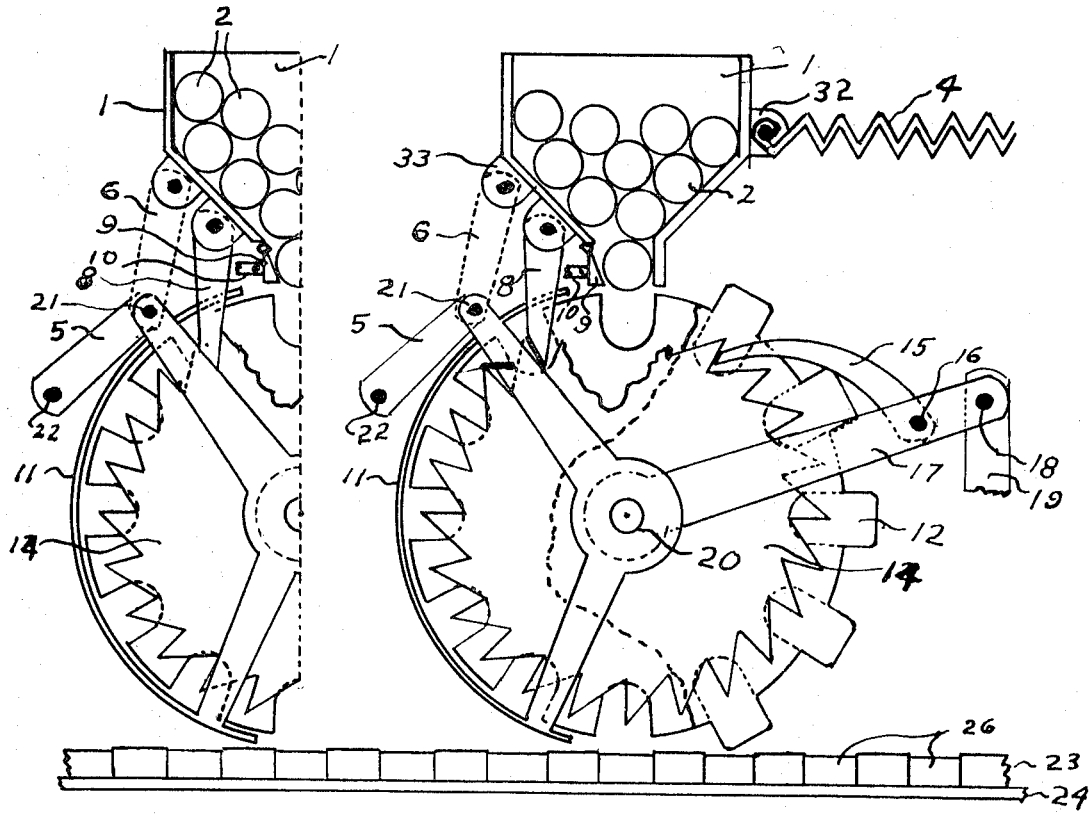
FIG. 1 is a cutaway end view of the pellet-feeding units and the belt and floor under the belt. A dotted in position is to illustrate the unit's free travel on the belt.
Figure 2:
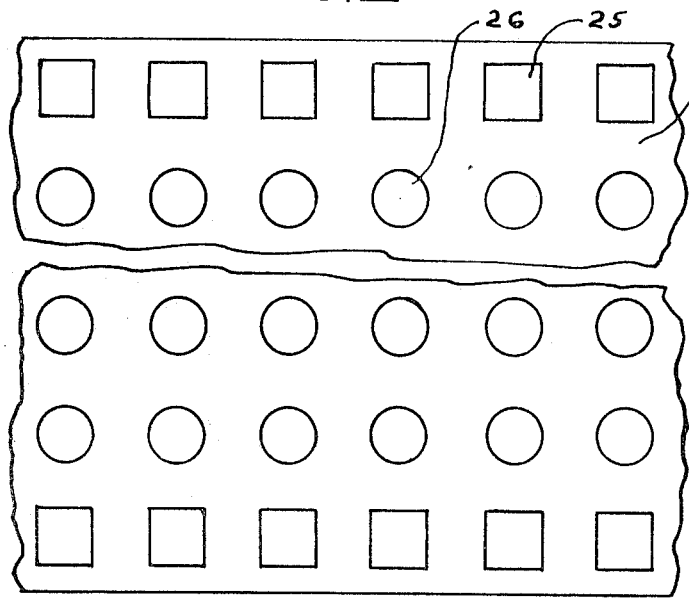
FIG. 2 is a top view of the belt drawn to the same scale as FIG. 1 but the central section is broken away due to space needed at this scale.

As an arbitrary example and referring to the figures suppose the input unit (code-feeding unit) receives a "clear" signal. By the "program" pawl 15 on the ratchet wheel 14 and holding pawl 8 of the ratchet wheel 14 are lifted. The spring 4 returns the unit to its starting end of its travel. Here the input unit and editing units are considered one unit for simplicity. By the "program" the output unit is allowed to move the belt to process out the code on the belt before the input unit causes a "stop" on the belt as it would being the extent of its belt travel towards the output unit. In processing out the code the output may have stopped the belt and released it several times. The belt moves except when held by a "stop." This sequence completed, the input unit is ready to start operations with an empty belt. Being at the output end of its free travel it holds the belt. Now suppose a signal is received to operate gate 9A of hopper 1. It initiates a common source of mechanical power 10 and gate 9A is operated to feed a pellet 2 onto transfer wheel 13. At the end of ANY input signal a sequence of programmed actions automatically take place. The gate or gates opened are closed by a power source 10. A power source 19 drives ratchet wheel 14 through ratchet wheel pawl 15. Pawl arm 17 is free and pivots on the main shaft 20 but the shaft 20 is keyed to ratchet wheel 14, sprocket wheel 12 and transfer wheel 13. Thus the ratchet wheel 14 moves the sprocket wheel 12 in mesh with the sprocket wheel holes 25 in the belt 23. The input unit FIG. 1 is moved so as its transfer wheel 13 has a new column of holes 26 on the belt 23 and new notches of the transfer wheel for the gates 9 A, B, C, etc. at the hopper 1. The pellet (if the wheel were filled) or pellets would have been placed on the belt for one column of holes. The unit has moved off its "stop." The belt moves one space to put it back on "stop." The operating sequence would have repeated for any gate 9 signal and the transfer wheel and belt act to make up code in groups for the output unit. The "space" signal would differ from a gate signal only that no gates would be operated resulting in an open column of holes 26 on the belt 23. Setting the desired code upon the belt 23 is shared by the hopper 1 gates 9 A, B, C, D etc. through the transfer wheel 13 to spread the code pattern over the belt's 23 surface. On the other hand, the editing function is also taking the same signals (in parallel) as the input receives and it might use but one gate as 9Q for all of them. The resultant pattern on the belt would be a line of pellets except for the "space" signal leaving an open hole. This could act as a "stop" indicator for the output unit.

The output starts its cycle of operation after it affects a "-stop" for the belt. For efficient operation of this invention it would usually cause the belt "stop". The operation of the output unit is by means of a cluster of single or multiple punches FIGS. 3A and 3B 28 of a pattern to pass through the holes in the floor 24 under the belt 23 while the belt is at rest. These punches 28 are placed below the belt and on operating rise through the belt's 23 holes 26. They contact and move any pellets 2 occupying the holes 26 as they pass through and move them upward. A cluster of single or multiple holed members 27 are, at this point, above the belt 23 in alignment with the punches 28 below the belt 23. The holes 29 in these members 27 above the belt 23 will pass the punches 28 but are too small to admit the pellets 2. The movement of the pellets 2 upward by the punches 28 thus move the holed members 27 upward. The code pattern is thus transfered in the output for the output of the machine it services.

I have given in considerable detail in description and drawings of my invention and it is hereby my intention to cover all modifications, constructions, and arrangements which are apparent to those skilled in the art and which fall within the scope and spirit of this invention. Having described my invention, I claim:

1. A pellet code setup and transfer device comprising in combination
  a. a cylinder having a longitudinal axis and an outer surface and having in the outer surface a plurality of pellet-receiving recesses adapted to receive pellets and arranged in a cross-grid pattern including a first plurality of rows aligned substantially parallel with the cylinder longitudinal axis and a second plurality of rows aligned substantially transverse the cylinder longitudinal axis;
  b. mounting means for mounting the cylinder for rotation about the cylinder longitudinal axis;
  c. a second plurality of pellet supply gates in a pellet supplying position adjacent the cylinder and aligned substantially parallel with the cylinder longitudinal axis for supplying pellets to the pellet-receiving recesses, one pellet supply gate uniquely associated with each of the second plurality of rows of pellet-receiving recesses;
  d. means for actuating the pellet-supply gates to supply pellets to the pellet-receiving recesses;
  e. a pellet-receiving belt having a longitudinal axis substantially transverse the cylinder longitudinal axis, the pellet-receiving belt being in a pellet-receiving position adjacent the cylinder and having a second plurality of rows of pellet-receiving holes therein for receiving pellets from the cylinder, each row of the rows of pellet-receiving holes uniquely associated with one row of the second plurality of rows of pellet-receiving recesses in the cylinder outer surface to receive pellets therefrom; and
  f. retaining means for retaining pellets within the cylinder pellet-receiving recesses during rotation of pellets from the pellet-supplying position to the pellet-receiving position due to rotation of the cylinder.

2. A pellet code setup and transfer device as claimed in claim 1 in which the pellet-receiving recesses are hemispherical and are adapted to receive spherical pellets.

3. A pellet code setup and transfer device as claimed in claim 1 in which the pellet-receiving recesses are semicubical and are adapted to receive cubical pellets.

4. A pellet code setup and transfer device as claimed in claim 1 in which the pellet-receiving belt is a continuous belt formed of a flexible material.

5. A pellet code setup and transfer device as claimed in claim 1 in which the pellet-receiving belt is a continuous belt formed of a plurality of nonflexible segments flexibly joined together.

6. A pellet code setup and transfer device as claimed in claim 1 in which the mounting means includes means for moving the cylinder and the retaining means parallel with the pellet-receiving belt longitudinal axis during rotation of the cylinder.

7. A pellet code setup and transfer device as claimed in claim 1 further comprising:
  a second plurality of pellet-engaging rods positioned in a row aligned substantially transverse the rows of pellet-receiving holes in the pellet-receiving belt and on a first side of the pellet-receiving belt
  a second plurality of actuating rods positioned in a row substantially parallel with the row of pellet-engaging rods on the side of the pellet-receiving belt opposite the pellet-engaging rods, each actuating rod uniquely associated with a pellet-engaging rod and having an opening therein of a size permitting entry of the pellet-engaging rod into the actuating rod without movement of the actuating rod yet preventing entry of a pellet into the actuating rod, whereby upon movement of the pellet-engaging rods through the pellet-receiving holes in the pellet-receiving belt and toward the actuating rod, those actuating rods associated with a pellet-receiving hole having a pellet therein are moved while those actuating rods associated with an empty pellet-receiving hole receive the pellet-engaging rod in the actuating rod hole and remain stationary.

* * * * *